No. 607,936. Patented July 26, 1898.
A. H. LESTER.
BICYCLE BELL.
(Application filed Dec. 8, 1897.)
(No Model.) 2 Sheets—Sheet 1.

WITNESSES:
A. F. Ponney.
A. G. Ponney.

INVENTOR:
Allen H. Lester
By his Atty
Chauncey W. Williams

THE NORRIS PETERS CO., PHOTO-LITHO., WASHINGTON, D. C.

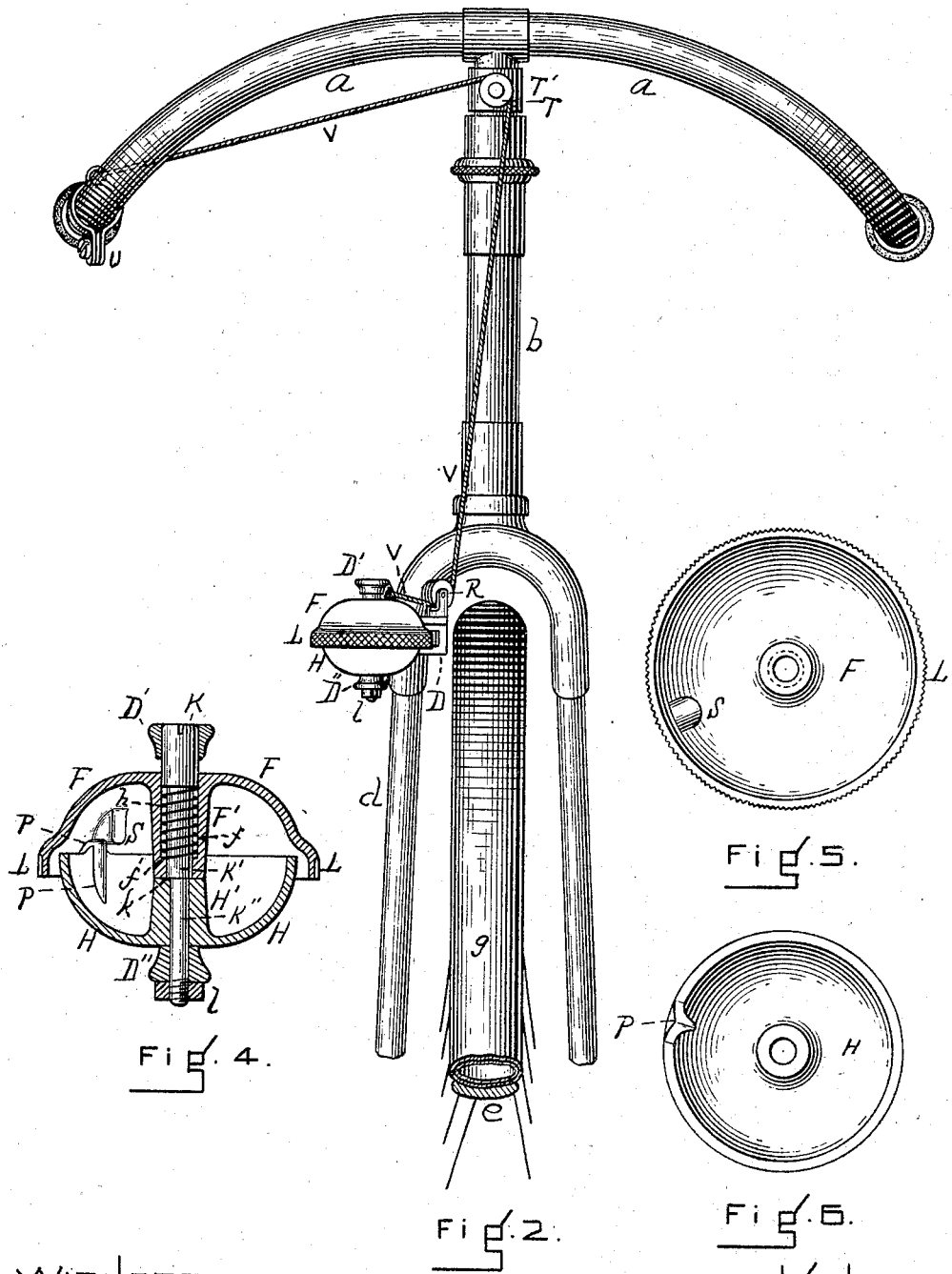

UNITED STATES PATENT OFFICE.

ALLEN H. LESTER, OF BATH, MAINE, ASSIGNOR TO THE TORREY ROLLER BUSHING WORKS, OF SAME PLACE.

BICYCLE-BELL.

SPECIFICATION forming part of Letters Patent No. 607,936, dated July 26, 1898.

Application filed December 8, 1897. Serial No. 661,129. (No model.)

*To all whom it may concern:*

Be it known that I, ALLEN H. LESTER, a citizen of the United States, residing in Bath, in the county of Sagadahoc and State of Maine, have invented new and useful Improvements in Bicycle-Bells, of which the following is a specification.

This invention relates to wheel-actuated bicycle-bells—that is to say, to that class of bells which are adapted to be attached to the frame and be sounded by means of contact with some portion of the wheel.

In my invention or improvement the bell is of the gong style and comprises two gong-shaped shells or cups, one of which is stationary and the other adapted to be swung against the side of the tire of the front wheel of the bicycle and thus rotated. The rotating shell by means of its internal shape strikes the stationary shell or gong with each rotation and sounds an alarm. The effect is to produce a series of sounds which are peculiar and different from the ordinary noise made by a hammer striking a gong and also which are not sufficiently loud and violent to startle a foot passenger or horse, but rather to simply attract his attention. Means are also provided whereby the rider may conveniently by a slight movement of the hand swing the bell into contact with the side of the tire.

Figure 1:
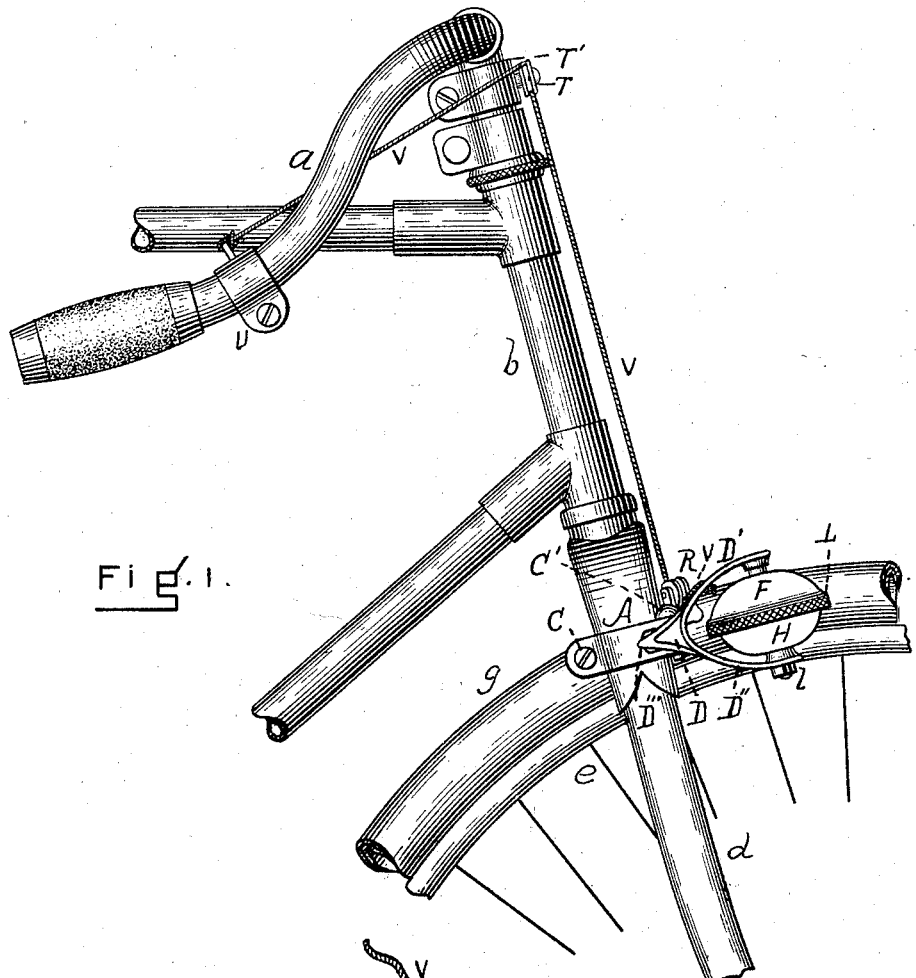
Figure 3:
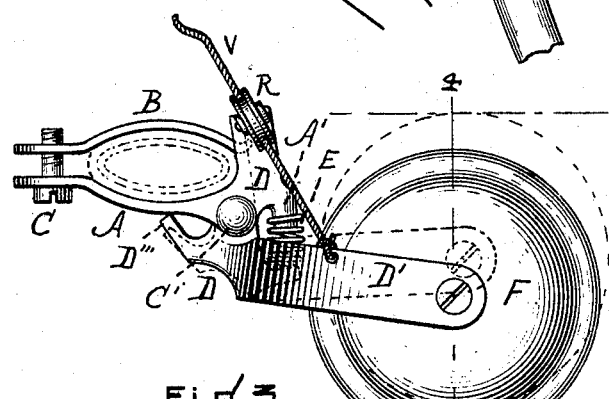

In the accompanying drawings, in which similar letters of reference indicate corresponding parts, Figure 1 is a side elevation of a sufficient portion of a bicycle to illustrate the application of my invention. Fig. 2 is a front elevation of the same. Fig. 3 is a plan view of the device in position on the fork, which is illustrated by broken lines. Fig. 4 is a central vertical section taken on line 4, Fig. 3. Figs. 5 and 6 are respectively plans of the insides of the upper and under shells or cups constituting the bell.

$a$ represents the handle-bar; $b$, the head; $d$, the front fork; $e$, the front wheel, and $g$ the tire on the front wheel of an ordinary bicycle.

A represents the stationary jaw, and B the movable jaw of a clamp made of suitable shape to embrace the right leg of the fork $d$ at a point which is opposite the side of the tire $g$. The outer ends of these jaws are adjustably connected by the screw C, and the inner end of the jaw B is pivotally secured to the jaw A. A frame D, Fig. 3, extending into the arms D' D'', swings horizontally from the jaw A by means of the pivot-pin C'. A spiral spring E is disposed on the horizontal extension A' on the jaw A and bears against the frame D, thus causing the arms D' D'' to be swung normally out until the foot D''' rests against the stationary jaw A of the clamp.

F and H are metallic shells or cups, the former being larger and overlapping the latter. The upper shell F is provided with a hub F' and the under shell with the hub H', said hubs normally abutting against each other, as shown in Fig. 4, and thus allowing the lower shell H to extend into the upper shell F. A bolt extends through these hubs, said bolt consisting of the slotted head K, the thick portion K', and the thinner portion K''. (See Fig. 4.) The portion $f$ of the bore in the hub F' is enlarged to receive a part of the head K' and a spiral spring $h$, which lies in said portion between the head K' and the shoulder $f'$. The bore in the hub H' is smaller in diameter than any portion of the bore in the hub F', and the portions K' and K'' of the bolt are of suitable diameter to fit into the corresponding portions of the hubs F' and H'. Hence by turning up the nut $l$ the upper end of the hub H' is brought tightly against the shoulder $k$ on the bolt and said bolt, lower shell H, and lower arm D'' rendered stationary. The upper shell F is free to be rotated on the portions K K' of the bolt, and its outer surface is preferably provided at L with serrations adapted to facilitate its engagement by the tire.

The upper or inner edge of the lower shell or gong is provided with an integral upward projection P, Figs. 4 and 6, and the inner surface of the upper shell or gong F is provided with an inward projection S, Figs. 4 and 5. It is evident that if the gong is swung against the power of the spring E into contact with the tire $g$ the portion L of the upper shell will be engaged by the side of the tire and said upper shell rotated upon the stationary bolt K K' K''. This rotation brings the projection S against the projection P. As soon as the projection S strikes the projection P the spring $h$ is contracted and the shell F slides upward on the portions K and K' of the bolt and the projection S slips over and by the projection P, the said spring immediately forcing the shell F back into the position indicated in Fig. 4, ready for the projections to come in contact with the next rotation. The location of the projections with relation to each other and the character of the blow struck as they come in contact, followed immediately by the slipping of one projection over the other, cause the sound produced on the gong to be somewhat peculiar and likely to attract attention, but at the same time not sharp nor liable to alarm or startle a passenger or horse.

In order that the rider may conveniently and instantly swing the bell from the position indicated in full lines in Fig. 3 to that indicated in broken lines in the same figure, the following mechanism is provided: A cord V is secured at one end to the arm D', extends under a pulley R, secured to the upper side of the frame D, thence around a pulley T, secured to the adjustable clip or clamp T', which is located on the head under the handle-bar, and thence to the adjustable clip or clamp U, to which its opposite end is secured, said clip U being secured to the handle-bar near the right handle. In order to sound the bell, the rider simply draws on the portion of the cord V which is between the two clips U and T, and the bell is pressed against the sides of the tire and rotated by means of the serrated edge L. Upon releasing the cord the spring E forces the bell back into the position indicated in Figs. 2 and 3.

It will be noticed that this bell does not come in contact with the "tread" portion of the tire, and hence is not affected by the presence of mud or dirt on the tire under ordinary conditions.

Having thus fully described my invention, what I claim, and desire to secure by Letters Patent, is—

1. In a bicycle-bell, a pair of metallic shells or cups one of which is adapted to be rotated by contact with the tire of a bicycle-wheel and the other of which is stationary, said shells or cups being provided on their inner surfaces with projections and being so placed with relation to each other that the rotation of the shell adapted to be actuated by the tire will bring the said projections into contact, and thus sound an alarm, substantially as described.

2. In a bicycle-bell, a pair of metallic shells or cups, one of which is adapted to be rotated by contact with the tire of a bicycle-wheel and the other of which is stationary, said shells or cups being provided on their inner surfaces with projections and being so placed with relation to each other that the rotation of the shell adapted to be actuated by the tire will bring the said projections into contact, the rotative shell being mounted on an axle which allows the shell to slide thereon in order that its projecting portion may slip over the projection on the stationary shell, thus sounding an alarm, substantially as set forth.

3. In a bicycle-bell, a bolt; the inverted shell or cup H adapted to be rigidly secured on said bolt; the shell or cup F mounted on said bolt and adapted to rotate and slide thereon; projections extending from the inner surfaces of said shells or cups; and a spring disposed between the bolt and the shell F and adapted to hold said shell F sufficiently near the shell H to cause the projection in the shell F to strike a blow upon the projection in the shell H as said shell F rotates, substantially as described.

4. In a bicycle-bell, a bolt; the inverted shell H adapted to be rigidly secured on said bolt; the shell F mounted on said bolt and adapted to slide and rotate thereon; the projection S extending inward from the inner surface of the shell F; the projection P extending upward from the upper edge of the inverted shell H into the path of the projection S; and a spring operating to hold the shell F normally toward the shell H, whereby rotation of the shell F causes the projection S to strike a blow upon and slip over the projection P, substantially as set forth.

5. In a bicycle-bell, a bolt; the inverted shell H rigid on said bolt; the shell F mounted on said bolt and adapted to rotate and slide thereon, the mouth of said shell F overlapping the edge of the mouth of the shell H and provided on its periphery with means whereby the tire of a bicycle-wheel may engage and rotate said shell F by friction; a spring holding the shells normally in the said position; and projections on the inner surfaces of said shells adapted to come in contact as the shell F rotates, and thus sound an alarm, substantially as described.

6. In a bicycle-bell, a clamp adapted to be applied to the fork of a bicycle opposite the side of the tire; the arms D' D''; frame D pivotally secured to the stationary jaw of the clamp and provided with the bolt K, K', K'' supported by said arms; the inverted shell H provided with the hub H' and inward projection P adapted to be rigidly secured to said bolt; the shell F provided with the hub F' and inward projection S adapted to rotate and slide on said bolt; a spring disposed around the bolt and adapted to hold the shell F normally against the shell H; and a spring intermediate of the stationary jaw of the clamp and the supporting-arms adapted to hold the shells normally away from the tire, substantially as set forth.

ALLEN H. LESTER.

Witnesses:
W. B. MUSSENDEN,
WM. S. SHOREY.